United States Patent
Steinberg et al.

(10) Patent No.: US 8,997,403 B1
(45) Date of Patent: Apr. 7, 2015

(54) COVERED RAIN GUTTER ASSEMBLY

(71) Applicants: Mark S Steinberg, Manieville, OH (US); Steven D Lucas, Bethel, OH (US)

(72) Inventors: Mark S Steinberg, Manieville, OH (US); Steven D Lucas, Bethel, OH (US)

( * ) Notice: Subject to any disclaimer, the term of this patent is extended or adjusted under 35 U.S.C. 154(b) by 0 days.

(21) Appl. No.: 13/861,635

(22) Filed: Apr. 12, 2013

Related U.S. Application Data

(63) Continuation-in-part of application No. 13/398,028, filed on Feb. 16, 2012, now abandoned.

(60) Provisional application No. 61/463,372, filed on Feb. 16, 2011.

(51) Int. Cl.
  E04D 13/00  (2006.01)
  E04D 13/076  (2006.01)
  F16M 13/02  (2006.01)

(52) U.S. Cl.
  CPC ............. E04D 13/076 (2013.01); F16M 13/02 (2013.01)

(58) Field of Classification Search
  USPC .................................................. 52/12, 11, 14
  See application file for complete search history.

(56) References Cited

U.S. PATENT DOCUMENTS

| | | | |
|---|---|---|---|
| 2,175,521 A | 10/1939 | Fry | 52/12 |
| 2,271,081 A | 1/1942 | Layton | 52/12 |
| 2,988,226 A | 6/1961 | Campbell | 210/474 |
| 3,388,555 A | 6/1968 | Foster | 405/119 |
| 3,550,381 A | 12/1970 | South | 405/119 |
| 3,950,951 A | 4/1976 | Zukauskas | 405/119 |
| 4,404,775 A | 9/1983 | Demartini | 52/12 |
| 4,876,827 A | 10/1989 | Williams | 52/12 |
| 4,936,061 A | 6/1990 | Palma | 52/12 |
| 4,937,986 A * | 7/1990 | Way et al. | 52/12 |
| 5,010,696 A | 4/1991 | Knittel | 52/12 |
| 5,245,800 A * | 9/1993 | Davenport | 52/11 |
| 5,388,377 A * | 2/1995 | Faulkner | 52/11 |
| 5,471,798 A | 12/1995 | Kuhns | 52/12 |
| 5,640,809 A | 6/1997 | Iannelli | 52/12 |
| 5,845,435 A * | 12/1998 | Knudson | 52/11 |
| 6,016,631 A | 1/2000 | Lowrie, III | 52/12 |
| 6,681,527 B2 * | 1/2004 | Baker | 52/12 |
| 6,904,718 B2 | 6/2005 | Fox | 52/12 |
| 7,257,933 B2 * | 8/2007 | Walters | 52/745.06 |
| D559,957 S * | 1/2008 | Rasmussen | D23/267 |
| 7,494,095 B2 * | 2/2009 | Walker et al. | 248/48.2 |
| 7,650,720 B2 | 1/2010 | Ealer, Sr. | 52/12 |
| 7,752,812 B2 * | 7/2010 | Knudson et al. | 52/12 |
| 7,765,742 B2 | 8/2010 | Ealer, Sr. | 52/12 |
| 7,891,142 B1 | 2/2011 | Ealer, Sr. | 52/12 |
| 7,950,187 B2 | 5/2011 | Iannelli | 52/11 |
| 8,250,813 B2 * | 8/2012 | Robins | 52/12 |
| 2005/0172565 A1 * | 8/2005 | Riley et al. | 52/12 |
| 2008/0190040 A1 | 8/2008 | Graves | 52/12 |
| 2009/0320381 A1 | 12/2009 | Gerig | 52/12 |

* cited by examiner

*Primary Examiner* — Basil Katcheves
(74) *Attorney, Agent, or Firm* — Alfred J. Mangels

(57) ABSTRACT

A rain gutter assembly including an overlying cover. A gutter trough is in the form of a channel having an upwardly-facing opening. The cover overlies the channel opening and includes a front edge that is spaced from the front edge of the gutter channel to define a gap therebetween to allow roof runoff to flow around the convex front edge of the cover and into the channel. A series of longitudinally-spaced support brackets are positioned within the gutter channel and support the gutter trough and the cover to provide a rigid gutter assembly. An end cap is provided at each longitudinal end of the gutter channel and overlies both the gutter channel cross section and the space between the gutter channel cross section and the cover, to prevent entry of leaves, twigs, and debris into the channel through the ends of the gutter trough.

28 Claims, 15 Drawing Sheets

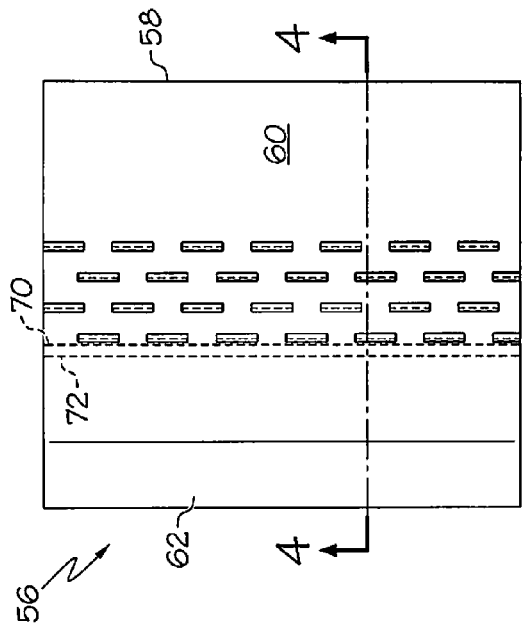
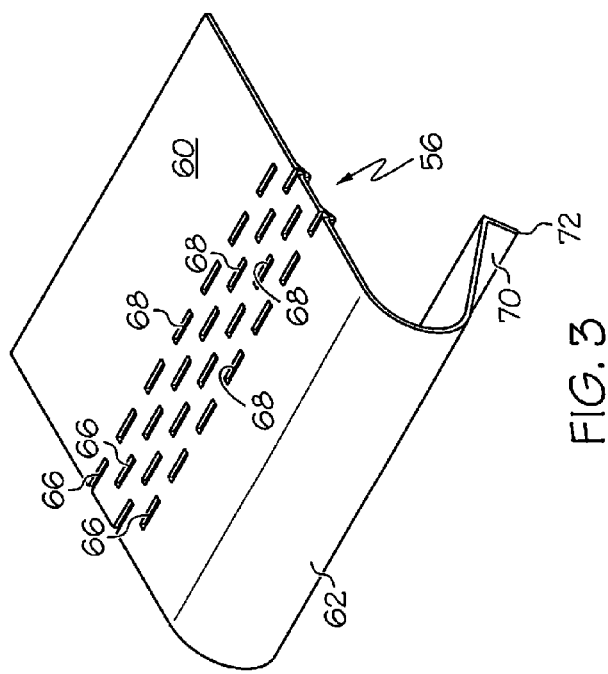
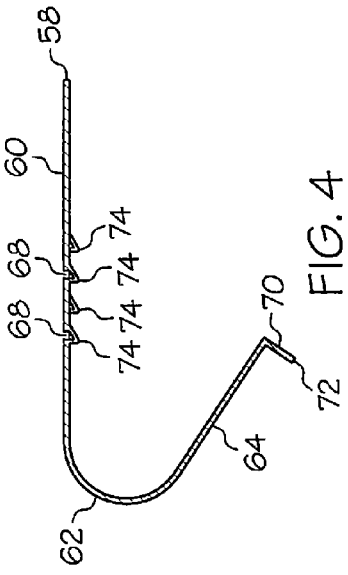
FIG. 3
FIG. 4
FIG. 5

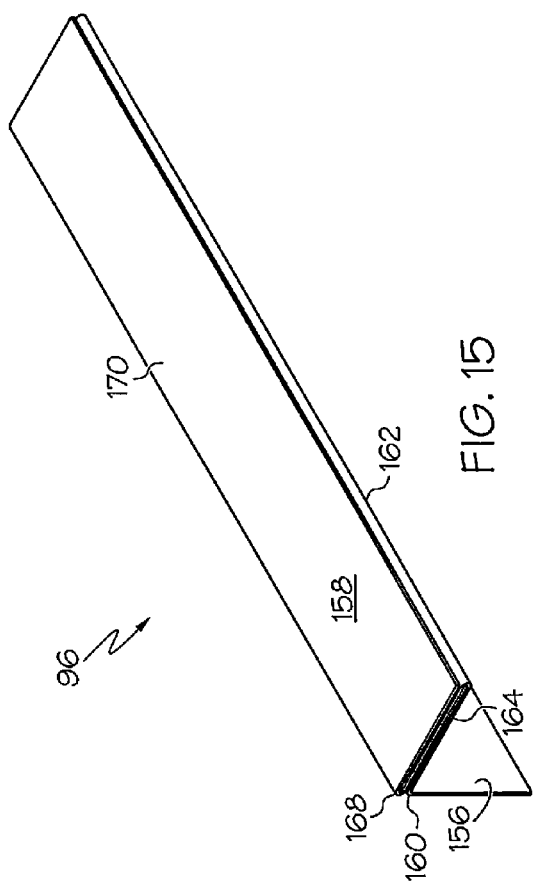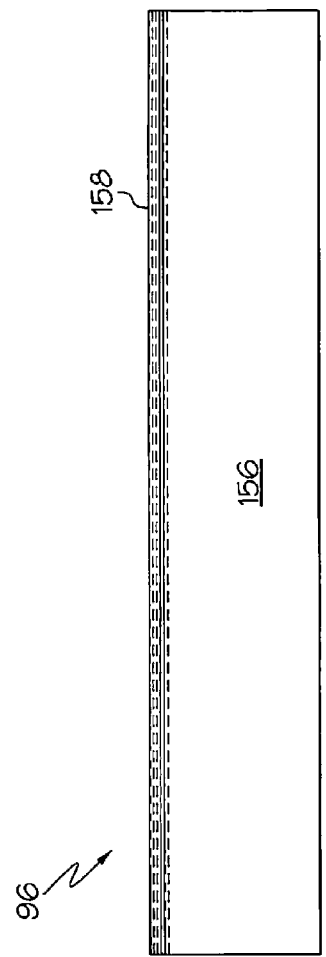

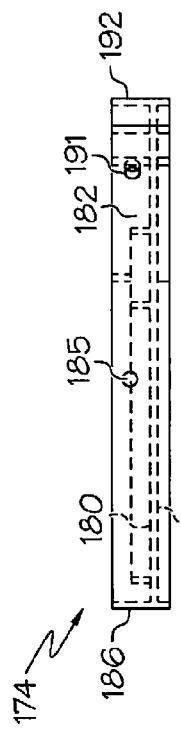
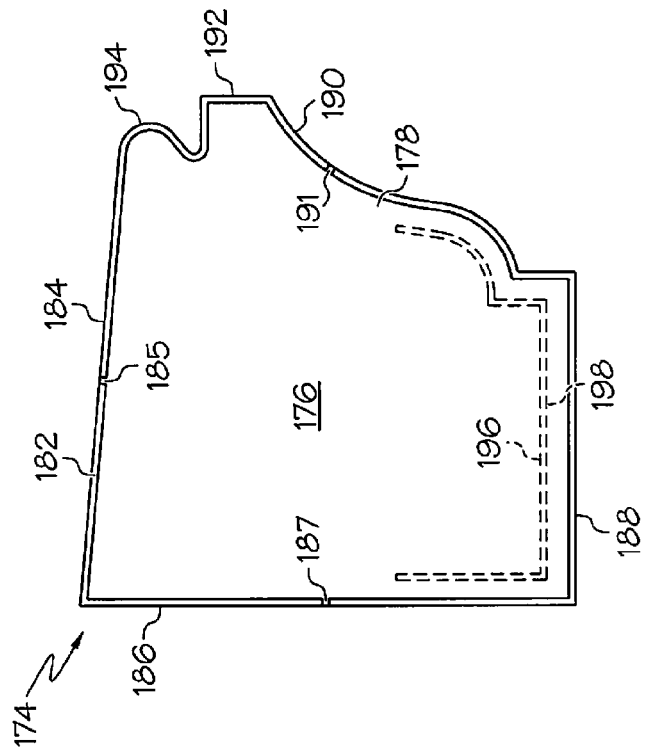
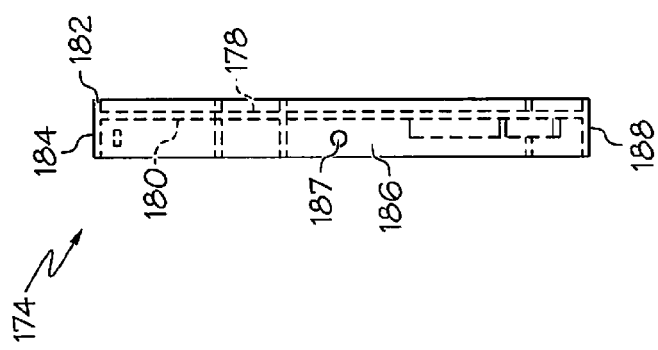

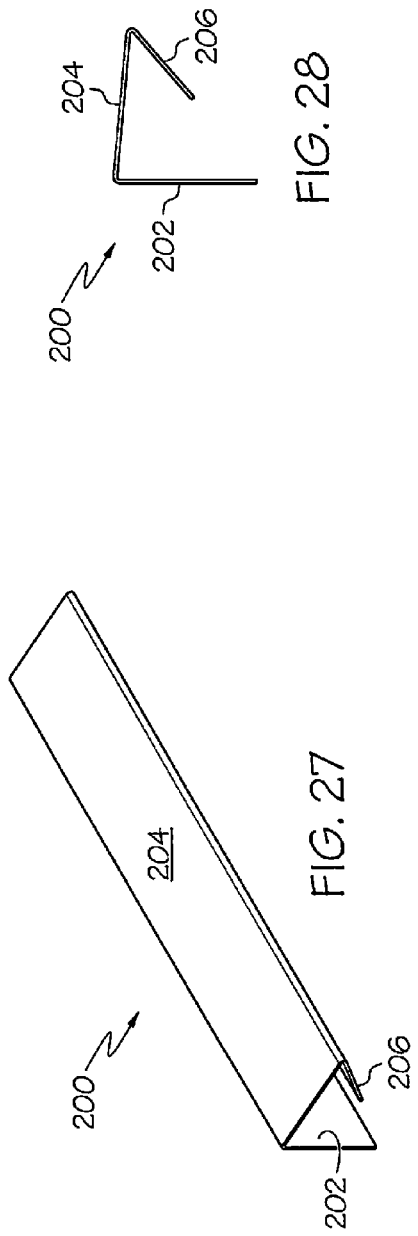
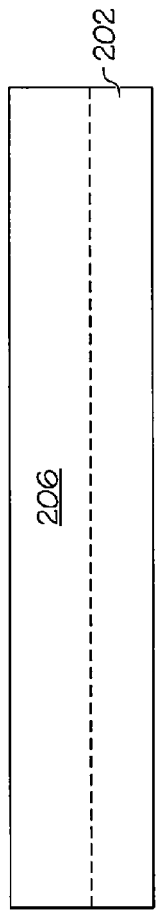
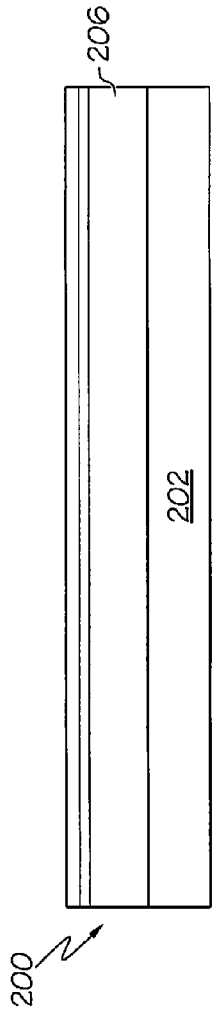
FIG. 27
FIG. 28
FIG. 29
FIG. 30

COVERED RAIN GUTTER ASSEMBLY

CROSS-REFERENCE TO RELATED APPLICATIONS

This application is a continuation-in-part of U.S. patent application Ser. No. 13/398,028, filed on Feb. 16, 2012, entitled "Rain Gutter Cover," which claims priority from U.S. Provisional Patent Application Ser. No. 61/463,372, filed on Feb. 16, 2011, the entire contents of each of those applications is hereby incorporated by reference to the same extent as if fully rewritten.

BACKGROUND OF THE INVENTION

1. Field of the Invention

The present invention relates to a covered rain gutter including a cover that is supported in overlying relationship with an upwardly-facing gutter trough opening. The cover serves to deflect leaves, twigs, and other debris and prevents them from entering the gutter trough and causing gutter clogging, while allowing free and unimpeded entry into the gutter trough of roof rainwater runoff. More particularly, the present invention relates to a covered rain gutter having a cover panel and having brackets that are positioned within the gutter trough and that extend between front and back walls of the gutter trough. The brackets are spaced along the length of a gutter trough to securely and rigidly support the gutter and its cover in a predetermined position relative to the gutter trough.

2. Description of the Related Art

Rain gutters for collecting rainwater runoff from pitched building roofs are generally U-shaped troughs in cross section, and have an upwardly-facing opening. Rain gutters are arranged along the edge of the roof of the building and in a position to collect the water runoff from the surface of the roof. Such rain gutters are usually connected to a fascia board on the side of the building by suitable connection elements, such as screws or nails, and include one or more downspouts to carry away the roof runoff that is collected in the gutter trough. The downspouts direct the roof runoff in a desired direction away from the building.

Because they are open in an upwardly-facing direction to collect the rain runoff from the roof, open rain gutters will also collect leaves, twigs, and other wind-blown debris. The collected leaves, twigs, and other debris within an open gutter ultimately are carried by the roof runoff to a downspout opening in the is gutter trough, which ultimately leads to clogging of the gutter downspout opening, thereby causing filling of the gutter trough with roof runoff and resulting undesired gutter overflow onto the adjacent building wall. Restoration of proper gutter function of an upwardly-open gutter trough requires that any such collected leaves, twigs, and debris be periodically removed, which is an operation that usually requires the climbing of a ladder and the physical removal of the collected leaves, twigs, and debris. The manual removal of collected leaves, twigs, and debris is an unwelcome and tedious chore—one that is potentially dangerous because it involves climbing a ladder to the building roof line in order to access the upwardly-facing opening of the gutter trough to enable removal of the collected leaves, twigs, and debris, and whatever other material that may be blocking the downspout opening in the gutter trough. The danger attendant with manual removal of the collected debris arises from the possibility of falls from the ladder if the person doing the debris removal is not careful.

Various gutter arrangements have been proposed, developed, and utilized over the years in an effort to avoid leaf, twig, and debris collection within the gutter trough, and to thereby attempt to solve the rain-gutter-cleaning problem by blocking the entry into the gutter of leaves, twigs, and debris. One approach involves the installation over the upwardly-facing gutter opening of a screen or mesh material. The screen or mesh has numerous small openings that are so sized as to allow roof runoff to freely flow into the gutter trough, while simultaneously screening out or blocking leaves and other debris from entering the gutter trough. However, many such screening arrangements have the screening element positioned horizontally over the upwardly-facing gutter opening, or at a very slight inclination, thereby allowing a collection of leaves, twigs, and debris on the surface of the screening element, leading to external clogging or blocking of the upwardly-facing gutter trough opening rather than internal gutter trough clogging at a downspout opening. Further, the stems of leaves can extend into the screening element openings, thereby enabling retention of the leaves on the surface of the screening material and preventing their being blown off by the wind. As a result, the retained leaves can serve to partially block the upwardly-facing gutter opening and thus limit the flow of roof runoff into the gutter trough for collection.

Another approach that has been developed to block the entry into gutters of leaves, twigs, and debris is a solid or imperforate cover panel that overlies the upwardly-facing gutter opening. The imperforate cover panel is inclined relative to a horizontal plane to cause roof runoff to flow downwardly over the surface of the cover panel and toward the front edge of the gutter trough. The imperforate cover panel has a rounded front edge that is spaced above the upper front edge of the gutter trough a predetermined distance, to provide a gap or opening between the cover panel front edge and the gutter trough front edge. Roof runoff can flow around the cover panel front edge and into the gap or opening to enter the gutter trough. The imperforate cover panel is intended to serve as a deflector of leaves, twigs, and other debris, to prevent their entry into the upwardly-facing gutter trough opening so that they either fall over the front edge of the gutter trough, or if they lie on the surface of the cover panel, so that they can be blown off the surface of the cover by the wind, while allowing the roof runoff to flow over and around the outer edge of the imperforate cover panel and into the gutter trough for collection to flow to the downspout opening for disposal.

An example of a rain gutter assembly that includes an overlying imperforate cover is disclosed in U.S. Pat. No. 7,117,643, which issued on Oct. 10, 2006, and is entitled Covered Rain Gutter. FIG. 1 of the present application shows the several elements of that assembly and their relative arrangement adjacent to a roof edge.

Although several approaches to configuring and supporting a gutter cover in overlying relationship to an upwardly-facing gutter trough opening have been disclosed, those approaches are either cumbersome and time consuming from an installation standpoint, or they are costly in terms of amount of attachment materials needed, or they are not particularly rigid in terms of the rigidity of the overall gutter structure, or the security of its attachment to a building surface.

Accordingly, there is a need for an improved rain gutter cover and its supporting arrangement for deflecting leaves, twigs, and debris, while freely allowing roof runoff to flow into the gutter trough for even heavy flows of roof runoff, one that does not involve the shortcomings of the previously-disclosed arrangements, and one that is readily adaptable to existing gutter troughs of different front-to-back sizes.

SUMMARY OF THE INVENTION

Briefly stated, in accordance with one aspect of the present invention, a rain gutter assembly is provided for collecting surface roof runoff from a building roof without clogging of the gutter by leaves and other debris. The rain gutter assembly includes a substantially U-shaped, elongated gutter trough for placement along and adjacent to a sloping roof of a building for collecting rain roof runoff from the roof. The gutter trough includes a rear wall that is adapted to abut a substantially vertical building surface adjacent to an edge of the roof, a bottom wall that extends substantially perpendicularly from the rear wall, and a front wall extending upwardly from a front edge of the bottom wall. The rear wall, the bottom wall, and the front wall together define a U-shaped channel having an upwardly-facing opening, the front wall including an inwardly-extending lip at an uppermost edge.

At least two support brackets are positioned within the gutter trough and are spaced from each other along the gutter channel, each support bracket including at least one passageway for receiving a fastener for connecting the bracket and gutter trough rear wall to the building surface. The brackets include a bracket body having a hooked outer end that is adapted to engage the inwardly-extending lip of the gutter trough, and having an inner end defining a mounting surface adapted to contact an inner surface of the gutter trough rear wall. A passageway extends within the bracket body toward the mounting surface and is angularly arranged relative to the mounting surface for receiving a fastener for connecting the support bracket and gutter trough to a substantially vertical building surface adjacent to a roof edge.

A gutter trough cover overlies the upwardly-facing gutter trough opening. The cover includes a plate-like cover body that angularly overlies and is spaced above the upwardly-facing opening of the gutter trough, the cover including an inturned, outwardly-facing front wall that defines a curved front surface of the cover body and that terminates at a front edge of the cover body. The cover front wall overlies and is spaced vertically from the inwardly-extending lip of the gutter trough to define a longitudinally-extending gap therebetween for receiving roof runoff that flows from an upper surface of the cover, to and around the curved front surface of the cover, and into the gutter trough. The gutter cover includes a plurality of longitudinally-extending, parallel rows of spaced gutter cover openings for receiving at least part of a roof runoff flow, wherein the openings of adjacent rows are longitudinally offset from each other, and wherein the openings of adjacent rows have respective transverse ends in overlapping relationship in a longitudinal direction of the cover to capture roof runoff flow.

A support channel is provided for supporting a rear, inner end of the cover body relative to the building surface.

The present invention also relates to a cover for a rain gutter trough, to a rain gutter trough end cap, to a support bracket for use within a rain gutter trough, and to a support channel for supporting a rain gutter cover in overlying relationship with a gutter trough.

BRIEF DESCRIPTION OF THE DRAWINGS

The structure, operation, and advantages of the present invention will become further apparent upon consideration of the following description, taken in conjunction with the accompanying drawings in which:

FIG. 3 is a fragmentary front perspective view of an embodiment of a gutter cover that includes several rows of aligned cover surface openings;

FIG. 4 is a cross-sectional view of the gutter cover shown in FIG. 3, taken along the line 4-4 of FIG. 5;

FIG. 5 is a top view of the gutter cover shown in FIG. 3;

FIG. 11 is an enlarged, fragmentary, cross-sectional view of a portion of the gutter cover taken along the line 11-11 of FIG. 9;

FIG. 15 is an upper, front perspective view of a portion of the cover support channel included in the embodiment shown in FIGS. 6 and 7;

FIG. 16 is a front view of the cover support channel shown in FIG. 15;

FIG. 19 is a front elevational view of the outwardly-facing surface of the gutter trough end cap shown in FIG. 18;

FIG. 20 is a top view of the gutter trough end cap shown in FIG. 18;

FIG. 21 is a left end view of the gutter trough end cap shown in FIG. 18;

FIG. 27 is a top perspective view of the cover support channel shown in FIG. 23;

FIG. 28 is an end view of the cover support channel shown in FIG. 23;

FIG. 29 is a front view of the cover support channel shown in FIG. 23; and FIG. 30 is a rear view of the cover support channel shown in FIG. 23.

DESCRIPTION OF THE PREFERRED EMBODIMENTS

Figure 1:
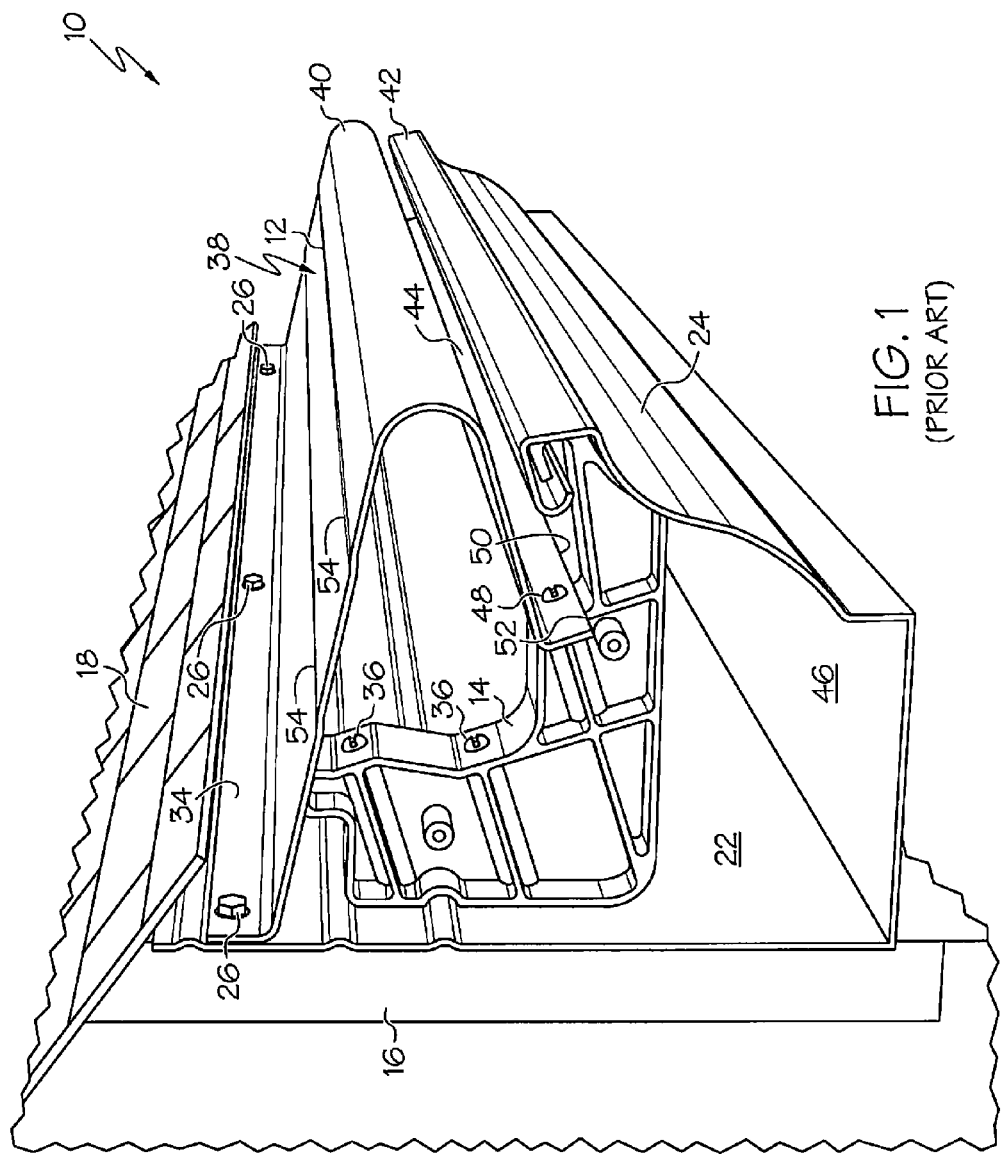
FIG. 1 is a fragmentary front perspective view of a known rain gutter assembly attached to a building fascia board and including a gutter trough, an imperforate gutter cover, and a gutter cover support bracket, but without gutter trough end caps that close off the end openings of the gutter trough.

Referring to the drawings, and particularly to FIG. 1 thereof, there is shown an embodiment of a known rain gutter assembly including an imperforate cover that overlies the gutter trough upper opening to block the entry into the gutter trough of leaves, twigs, and debris that would otherwise block the downspout opening in the gutter trough. The structure and operation of that covered gutter embodiment is disclosed in U.S. Pat. No. 7,117,643 B2, which issued on Oct. 10, 2006, the entire contents of which is hereby incorporated herein by reference to the same extent as if fully rewritten. The gutter arrangement disclosed in that patent is a rain gutter assembly that includes a gutter trough 10, an imperforate gutter trough cover 12, and spaced support brackets 14 (only one of which is shown in FIG. 1) for supporting the cover in position over the upwardly-facing opening of the gutter trough. The several components of that assembly are interconnected with each other and provide a rigid gutter assembly structure that is utilized either as an original gutter assembly arrangement, such as for a newly-constructed building, or as a complete replacement of a preexisting, uncovered gutter trough that had previously been attached to an existing building. The gutter assembly is mounted to a fascia board 16 and underlies the sloping roof 18 of the building.

Figure 2:
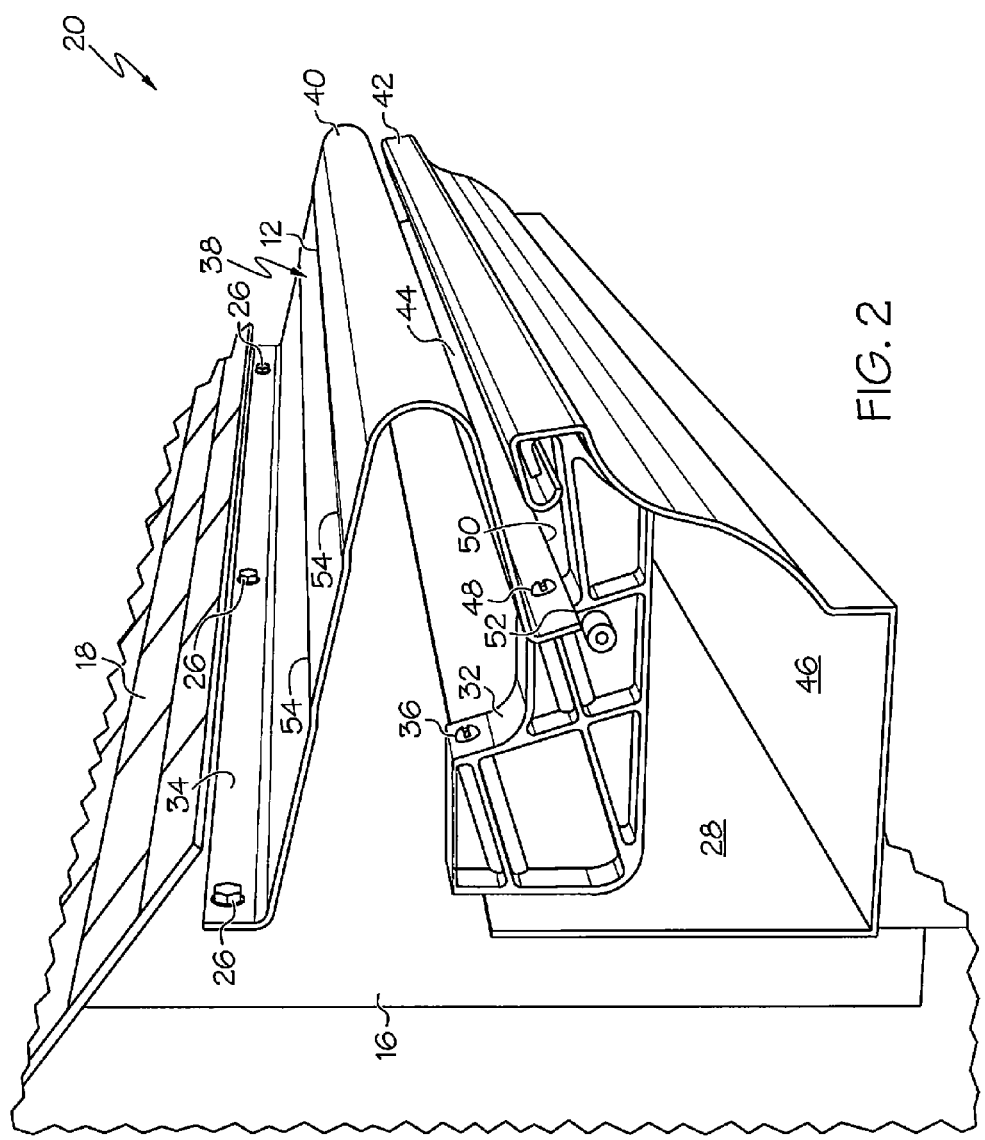
FIG. 2 is a fragmentary front perspective view of another embodiment of a rain gutter trough attached to a building fascia board and to which an imperforate gutter cover has been added, but without an end cap that closes off the end opening of the gutter trough.

The gutter assembly arrangement shown in FIG. 2 is similar in function to that of the FIG. 1 arrangement in that it includes an imperforate gutter trough cover 12, but it involves a retrofit arrangement in which a gutter trough cover is added to an existing gutter trough 20. In the FIG. 1 arrangement the gutter trough rear wall 22 is higher than the front wall 24 and is connected with the cover by a series of screws 26, whereas in the FIG. 2 arrangement the gutter trough rear wall 28 is substantially the same height as that of the front wall 30, and the bracket 32 is of a different form from bracket 14 of the FIG. 1 arrangement.

As shown in FIGS. 1 and 2, gutter assemblies 10 and 20 each include imperforate gutter cover 12 that is secured to fascia board 16 by a plurality of fasteners 26. The fasteners pass through spaced openings formed in upwardly-extending lip 34 of gutter cover 12. Additionally, a plurality of support brackets 14, 32, only one of which is shown in FIGS. 1 and 2, are positioned within gutter trough 24, 30 and are spaced from each other along the length of the respective gutter assembly at predetermined intervals. Support brackets 14, 32 can advantageously be formed from a rigid plastic material by injection molding. Suitable materials include ABS, polypropylene, and the like. Support brackets 14, 32 are connected to fascia board 16 to support gutter trough 24, 30 and imperforate gutter cover 12, and to provide a strong, rigid gutter assembly. The connection of gutter cover 12 to support brackets 14, 32 is by means of suitable fasteners, such as screws 36, nails, or the like.

Imperforate gutter cover 12 serves as a deflector of leaves, branches, twigs, and other forms of debris that can fall into an open, uncovered gutter trough 10, 20 and could block or restrict the rate of flow of collected roof runoff through the gutter trough downspout opening. Gutter cover 12 includes a substantially flat, elongated, sloping, imperforate plate-like panel that overlies gutter troughs 10, 20. The upper surface 38 of cover panel 12 extends outwardly from upwardly-extending lip 34 that is connected with fascia board 16, to a cover panel outermost end 40 that is spaced outwardly from fascia board 16. Cover upper surface 38 overlies substantially the entire upwardly-facing opening of gutter troughs 10, 20. Cover panel outermost end 40 is a horizontally-outwardly-facing, convexly-curved portion that defines a rounded outer end that has an outermost surface that is spaced from fascia board 16 to overlie gutter trough front lip 42 to thereby prevent unwanted debris from falling into troughs 10, 20. Outermost end 40 is spaced vertically above gutter trough front lip 42 a predetermined distance to define a gap to allow roof runoff to flow around outermost end 40 and into the gap. The gap defines an opening that can have a vertical spacing of the order of from about ¼ in. to about ¾ in., which is sufficiently large to permit the flow of roof runoff around the cover outermost end 40 and to allow entry of the roof runoff into the gutter trough, but it also is sufficiently small to block the entry into the interior of the gutter trough of leaves and other undesired wind-blown debris.

Gutter cover 12 includes a lowermost outer end defined by a longitudinally-extending end panel 44 that is a continuation of curved outermost end 40 and is bent to extend in a generally downward direction, toward gutter trough bottom wall 46. End panel 44 is a flat panel that is secured to respective support brackets 14, 32, such as by respective longitudinally-spaced screws 48, and includes a lower edge 50 that is received on respective stop surfaces 52 formed on support brackets 14, 32. Stop surfaces 52 allow accurate positioning of end panel 44 of cover 12 so that cover outermost end 40 is uniformly spaced from gutter trough front lip 42 along the entire length of the gutter trough when the covered gutter is fully assembled.

Gutter cover 12 can be made from the same types of materials as gutter trough 10. Preferably, those components are formed from aluminum alloy sheet having a thickness of about 0.032 in., but they can also be formed from an extruded polymeric material. As shown, gutter cover 12 includes several longitudinally-extending, spaced, parallel, step-like ridges 54 formed in the upper surface 38 of cover 12. The ridges are spaced from each other in a downward direction of the cover surface and extend along the length of the cover. Ridges 54 serve to slow the rate of flow of roof runoff as it flows over the upper surface 38 of cover 12, and to thereby spread some of the roof runoff to flow laterally over upper surface 120 in order for the flow of roof runoff to be distributed substantially uniformly along the length of cover 12. After passage over ridges 54, the roof runoff flows downwardly over and around forward outer end 40 of cover 12. As it flows over outer end 40 the roof runoff tends to remain in contact with the curved surface at outer end 40 of cover 12 by the effect of the surface tension of the roof runoff, whereby the runoff tends to adhere to outer end 40 and to pass around the surface of outer end 40 toward lower edge 50, whereupon it falls into gutter troughs 10, 20 by the force of gravity.

A modified form of the gutter cover is shown in FIGS. 3-5. Gutter cover 56 has an overall form that is similar to that of gutter cover 12 shown in FIGS. 1 and 2, but it lacks upwardly-extending lip 34 that is present on the cover panel shown in FIGS. 1 and 2. Instead, gutter cover 56 includes a longitudinally-extending inner end edge 58 that defines an end of cover panel planar upper surface 60. Cover panel 56 also includes a rounded outer end 62, the lower end of which terminates at a longitudinally-extending, downwardly-sloping end panel 64.

Gutter cover 56 also differs from gutter cover 12 in that it includes several longitudinally-extending, laterally-spaced rows 66 of aligned, generally rectangular openings 68 that are shown in FIGS. 3-5. Generally rectangular openings 68 have major and minor axes, and the major axes of the openings in a given row are each aligned with each other to be coaxial. FIG. 3 shows four longitudinally-extending, laterally-spaced, parallel rows 66 of spaced, generally rectangular openings 68. As can be seen in FIGS. 3 and 5, the generally rectangular openings 68 of adjacent rows 66 are longitudinally offset from each other. However, the longitudinal ends of the openings 68 of each adjacent row 66 overlap the longitudinal ends of the openings 68 of the immediately adjacent rows 66, so that at least a portion of the roof runoff flowing over the upper surface 60 of cover 56 passes into openings 68, while the volume of roof runoff that does not flow into openings 68 continues along the upper surface of cover panel 56 toward outer end 62 to flow around rounded outer end 62 and into an underlying gutter trough. Thus, the flowing roof runoff does not have an unimpeded, continuous, straight, and free downward flow path along the upper surface of cover 56 to flow past an opening of one of the rows of openings that are formed in upper surface 60 of cover 56 as the roof runoff flows along upper surface 60 toward rounded outer end 62. Gutter cover 56 also includes a longitudinally-extending end panel 70 that extends downwardly from panel 64 and terminates at a lowermost outer edge 72

As best seen in FIG. 4, each of the generally rectangular openings 68 in cover 56 includes a downwardly-extending guide panel 74 that is inclined relative to the upper surface 60 of the cover. Guide panels 74 serve by virtue of the surface tension of the roof runoff to guide the runoff that passes into the generally rectangular openings 68, and to direct it toward the inner surface of cover 56 toward end panel 70, whereupon the roof runoff flows into the gutter trough.

Guide panels 74 can result from a stamping operation that simultaneously makes cuts in the cover upper surface 60 to form the opposed smaller edges of openings 68, and also to deflect downwardly one of the longer edges of cut that defines the openings, the longer edges that are closest to outer end 62 of the cover. The bent portions of guide panels 74 of the openings 68 are bent downwardly in a direction toward the interior of a gutter trough when installed. The bend takes place about an axis defined by the longer edges of the openings that lie closest to cover inner edge 58, in order to form the respective inwardly-directed guide panels 74.

The upwardly-facing surfaces of guide panels 74 serve as flow guide surfaces by virtue of the adhesion to the upwardly-facing surfaces of guide panels 74 of the flowing roof runoff that enters openings 68. The adhesion of the flow results from the surface tension of the runoff, to induce inward flow of the runoff that enters openings 68 to flow into the underlying gutter trough, and to thereby conduct a greater volume of the flowing roof runoff through openings 68 than would flow therethrough if the generally rectangular openings were completely open by removal of the stamped material and did not include the downwardly inclined guide panels 74, because there would then be no adhesion-based inward flow effect, but merely the gravity effect acting on a portion of the roof runoff. Any roof runoff that does not pass into openings 68 continues along upper surface 60 to cover panel outer end 62, to flow therearound toward end panel 70 and into the gutter trough for collection.

Figure 6:
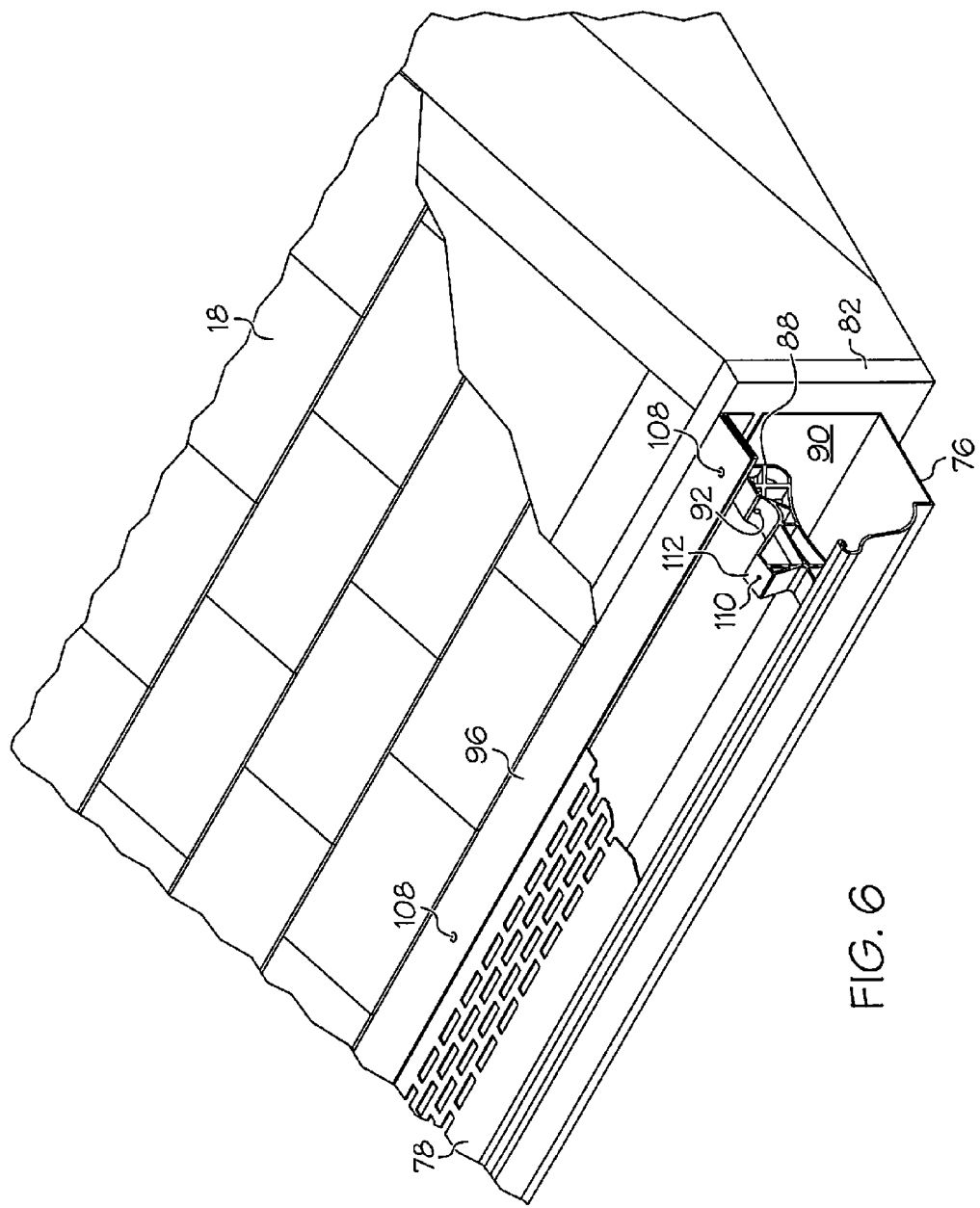
FIG. 6 is a fragmentary top perspective view of another embodiment of a rain gutter assembly.

FIG. 6 is a fragmentary perspective view of a further embodiment of a rain gutter assembly attached to a building sidewall. The illustrated assembly shown in FIGS. 6 and 7 includes a gutter trough 76, which can be either a new gutter trough or a preexisting gutter trough to provide a retrofit arrangement. That gutter embodiment also includes a modified gutter trough cover 78, and a modified support bracket 80. In that modified covered gutter assembly a differently configured bracket 80 having a hooked outer end 84 (see FIG. 7) is installed within gutter trough 76 by first engaging the hooked outer end 84 of the bracket with the inwardly-curved lip 86 of the gutter trough, and thereafter securing the opposite, inner end surface 88 of the bracket to the trough rear wall 90 and to fascia board 82 by a suitable fastener 92, such as a nail or a screw. Fastener 92 extends within an inclined throughbore 94 in bracket 80, through the to gutter trough rear wall 90, to be securely received in the building fascia board 82, to thereby retain bracket 80 within the gutter trough, and to securely connect the gutter trough and the bracket to the fascia board. A series of such brackets 80 is provided for rigidly supporting gutter trough 76 and for receiving cover 78. Brackets 80 can be spaced from each other along the longitudinal length of gutter trough 76 at a spacing between adjacent brackets of approximately two-foot intervals.

Gutter trough, or channel, 76 as well as gutter trough cover 78 can be formed from various well-known materials, including sheet metals such as copper, aluminum alloy, or the like, as well as from extruded polymeric materials. An advantageous material is aluminum alloy sheet that can conveniently be supplied in the form of a coil formed from a narrow, elongated, flat strip of aluminum alloy sheet having a thickness of the order of about 0.032 in. The sheet can be formed into a gutter on-site by uncoiling the aluminum alloy sheet and drawing it through a suitable forming die to bend the sheet into an elongated, generally U-shaped trough or channel such as the form of channel or trough 76 shown in FIGS. 6 and 7. Using such aluminum alloy coils enables the formation of a continuous, seamless gutter trough section of any desired length. When made from a polymeric material, such as polypropylene, polyvinyl chloride, or the like, the gutter trough can be pre-formed by extrusion of the plastic material through a suitably shaped extrusion die, cut into desired lengths, and subsequently transported to the building site. However, such polymeric gutters might not be seamless, depending upon the lengths of the individual gutter sections and the length of the roof edge under which they are to be mounted, and suitable connection arrangements and seals are needed to connect end-to-end troughs to provide a leak-proof connection.

After the brackets have been installed in the gutter trough and the trough/bracket assembly has been secured to the fascia board, an elongated support channel 96 is secured to the building fascia board 82 above and parallel to the gutter trough 76 by a series of longitudinally spaced fasteners 98, such as nails or screws. Support channel 96 includes an elongated, longitudinally-extending narrow slot or opening 100 that is provided to receive inner end 102 of cover 78 that is adapted to overlie the upwardly-facing opening of gutter trough 76. Inner end 102 of cover 78 is secured to support channel 96 by means of screws 108. If desired, cover 78 can be is secured to bracket 80 by means of screws 104 that pass through openings formed or drilled in a forwardly-extending portion 106 of the upper surface of cover 78. Screws 104 are received in a blind bore 110 provided on a generally upwardly-facing, sloped step surface 112 of bracket 80.

Figure 7:
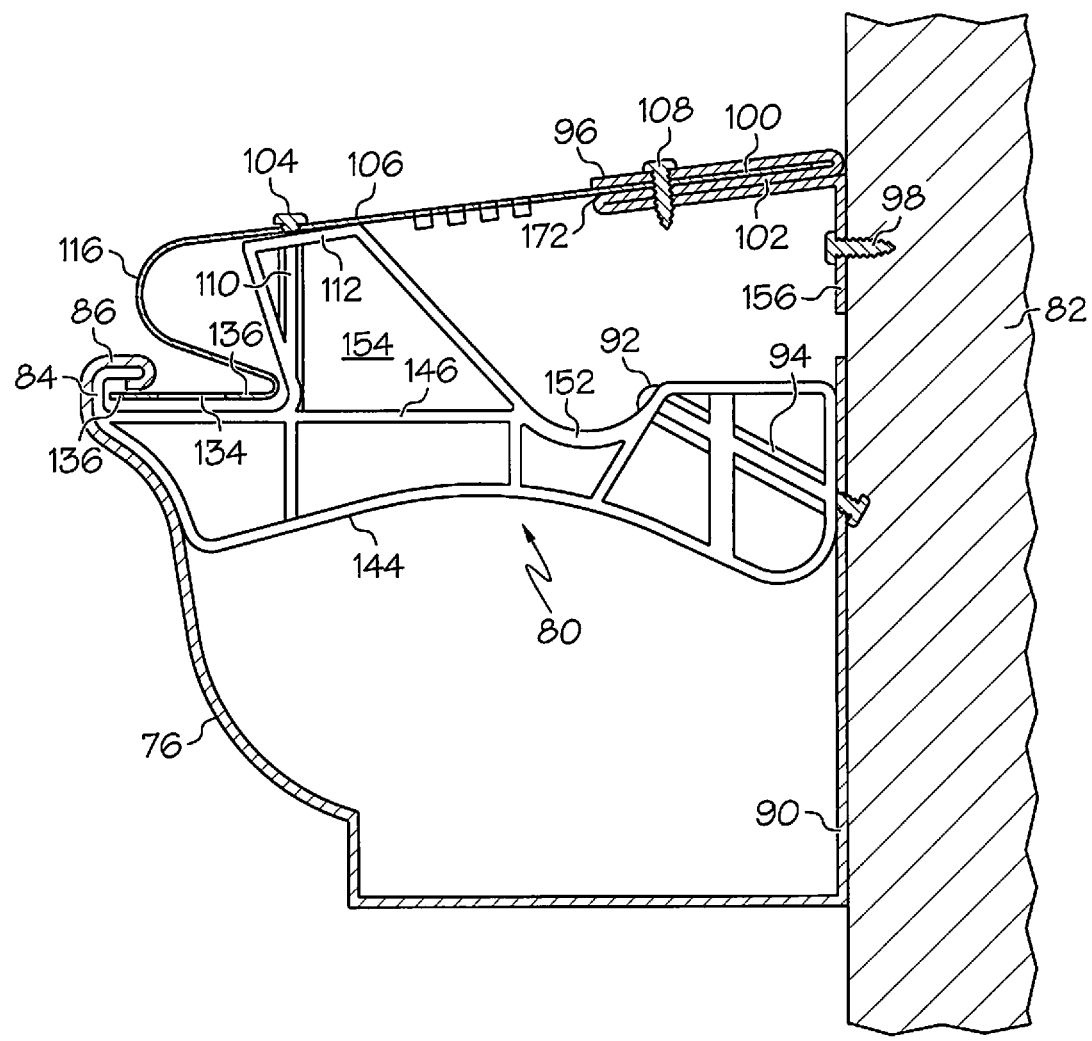
FIG. 7 is a cross-sectional view of the gutter assembly shown in FIG. 6.

Although the gutter assembly shown in FIG. 7 includes screws 104 to secure cover 78 to bracket 80, screws 104 can be dispensed with, if desired. In that event, cover 78 can be retained at its inner end 102 by support channel 96 and screws 108, and at its forwardly-extending leg 136 by hooked outer end 84 of bracket 80.

Figure 8:
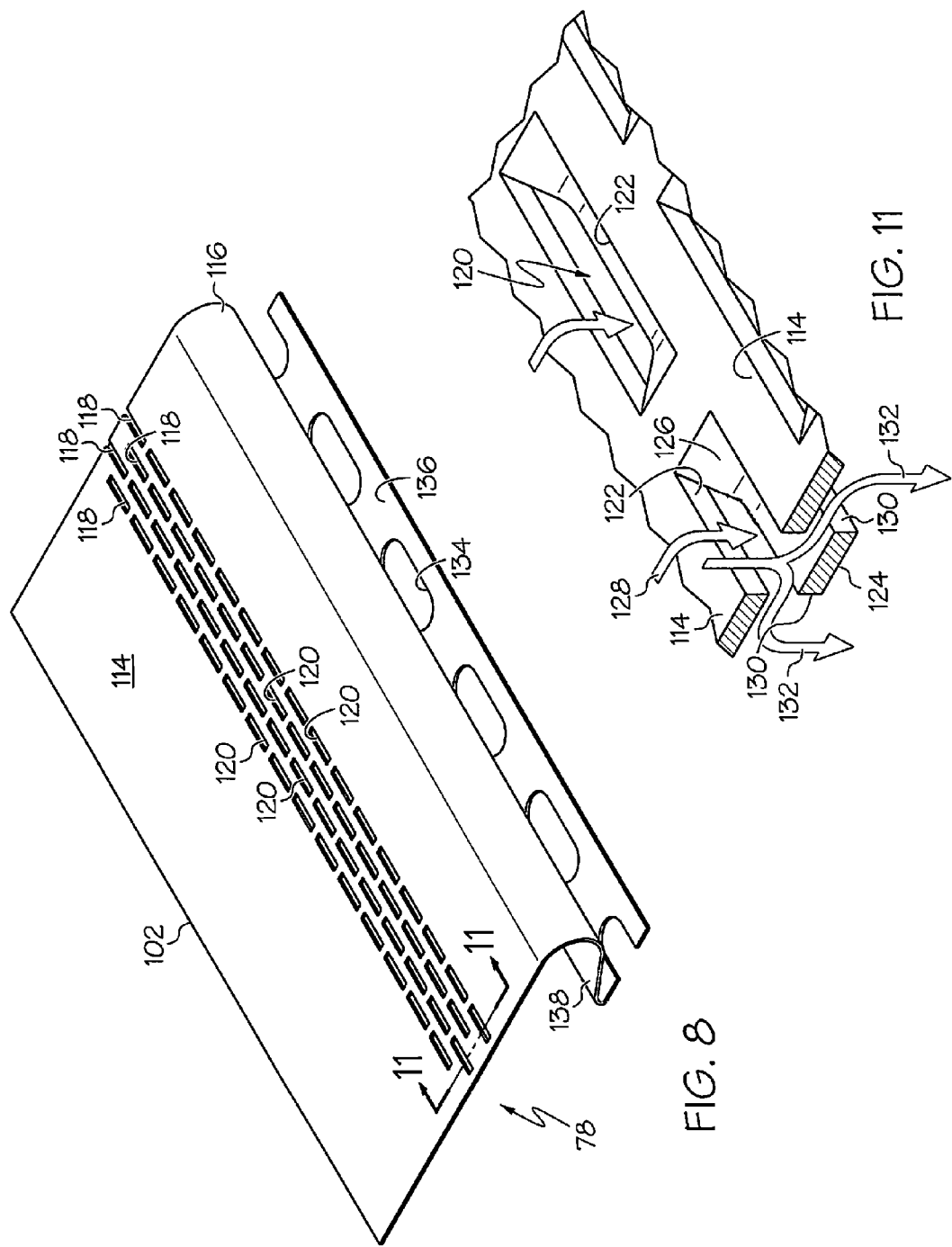
FIG. 8 is a fragmentary top perspective view of a portion of the gutter cover shown in FIGS. 6 and 7.
Figure 9:
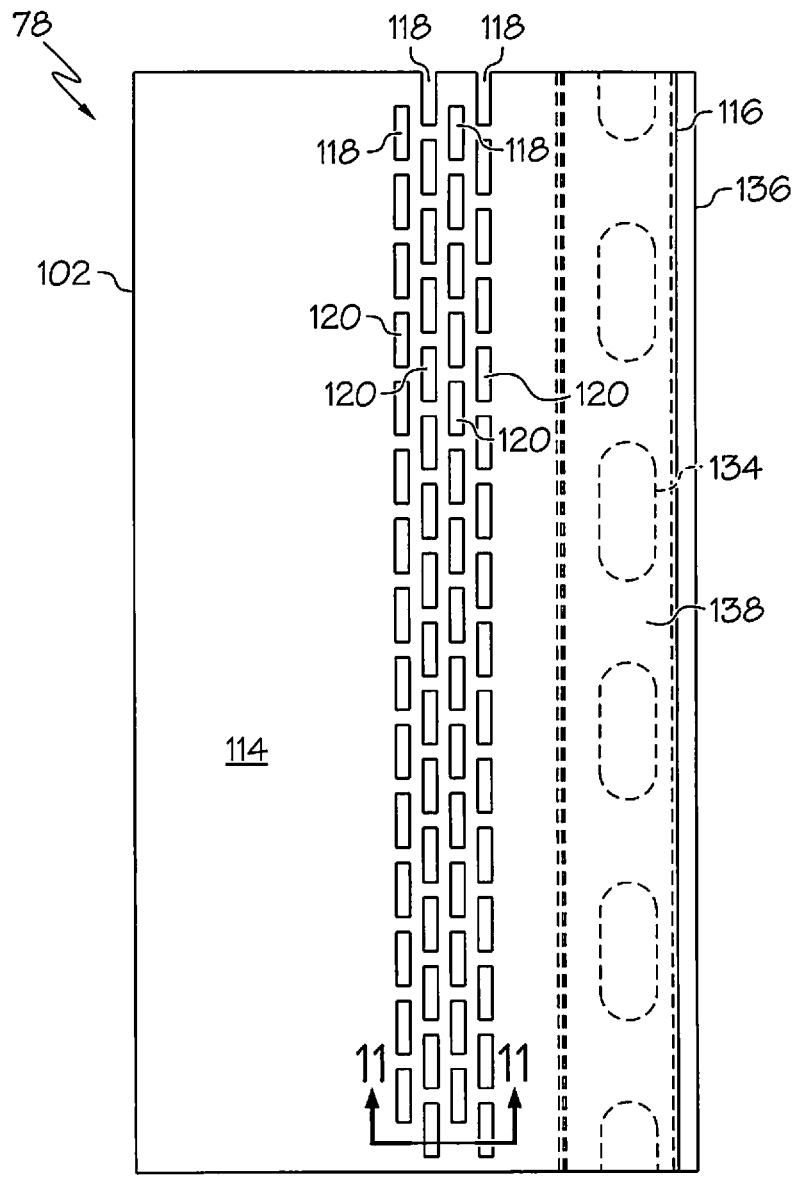
FIG. 9 is a top view of the gutter cover shown in FIGS. 6 and 7.
Figure 10:
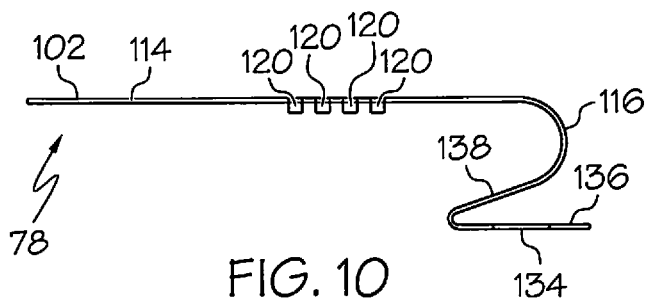
FIG. 10 is an end view of the gutter cover shown in FIG. 9.

The form of cover 78 of the FIG. 6 covered rain gutter assembly embodiment is shown in FIGS. 7-10. As shown in FIGS. 8-10, cover 78 includes a substantially flat upper surface 114 that extends from a longitudinally-extending inner end 102 to a longitudinally-extending, convexly-curved outer end 116. Cover 78 also includes several longitudinally-extending, laterally-spaced rows 118 of aligned, generally rectangular openings 120 that each have major and minor axes. The major axes of the openings in a given row 118 are aligned with each other to be coaxial.

Each of FIGS. 7-10 shows four longitudinally-extending, laterally-spaced, parallel rows 118 of spaced, aligned, generally rectangular openings 120. As can be seen in FIGS. 8 and 9, the generally rectangular openings 120 in each of rows 118 are longitudinally offset from each other. However, the longitudinal ends of the openings 120 of each row 118 overlap the longitudinal ends of the openings 120 of each of the adjacent rows 118, so that during a heavy flow of roof runoff at least a portion of the volume of the roof runoff flowing over and along the upper surface 114 of cover 78 passes into an opening 120, while the remaining volume of roof runoff that does not flow into openings 120 continues in a downward direction along the upper surface 114 of cover 78 toward outer end 116 to flow over and around outer end 116 and into gutter trough 76.

Because of the longitudinal offset of openings 120 relative to each other in adjacent rows of openings, and because of the overlapping end regions of the openings of adjacent rows 118, the flowing roof runoff does not have an unimpeded, continuous, straight, and free flow path over the rows of openings 120 formed in upper surface 114 of cover 78 as the roof runoff flows from the adjacent roof edge toward cover outer end 116. Instead, some of the runoff flows over each of the openings, so that at least a portion of the volume of the roof runoff flows into and through openings 120 and into the underlying gutter trough.

During a heavy volume of roof runoff flow, the portion of the runoff volume that does not pass into and through openings 120 continues downwardly over the surface of cover 78 to curved front end 106, to pass therearound and enter gutter trough 76. Openings 120 can have a length of from about 0.50 in. to about 0.55 in. and a width of from about 0.10 in. to about 0.125 in. The longitudinal spacing between adjacent openings 120 in a given row 118 can be from about 0.40 in. to about 0.425 in., and the spacing between opposed longitudinal edges of openings 120 in adjacent rows 118 can be from about 0.25 in. to about 0.275 in.

FIG. 11 is an enlarged, fragmentary, cross-sectional view taken along a minor axis of an opening 120 and along line 11-11 of FIG. 9. As shown in FIG. 11, the opening 120 when formed by a punching operation results in depressing a portion of upper surface 114 by a suitable die that provides longitudinal cuts in surface 114 that define longitudinal sidewalls 122, but that does not provide transverse cuts. The die deflects the rectangularly-shaped, punched cover material of upper surface 114 downwardly between the longitudinal cuts to provide a substantially rectangular, downwardly recessed planar region 124 that is spaced from the inner or downwardly-facing surface of and is parallel to the upper surface 114 of cover 78. End panels 126 at each longitudinal end of a recessed panel 124 remain connected to respective longitudinally-spaced ends of downwardly recessed panel 124 and also to the body of cover 78. The spacing between the upper surface of recessed panel 124 and the lower or inner surface of cover 78 can be from about 0.10 in. to about 0.125 in. As the result of the formation of recessed panel 124, opening 120 at the upper surface 114 allows a portion of roof runoff flow 128 to flow downwardly toward recessed region 124. But because panel 124 defines an imperforate surface, the entering flow 128 is deflected by panel 124 to flow through the longitudinal gaps or openings 130 at the longitudinal edges of panel 124 to define separate flows 132 that then fall into gutter trough 76. The pairs of longitudinal openings 130 thereby provide a greater flow cross-sectional area to allow more rapid volumetric flow of roof runoff to enter through the openings 120 and through longitudinal openings 130, to provide increased roof runoff capture that flows into the gutter trough. The increased flow area thereby helps to reduce the volumetric flow that reaches convexly curved front end 116, thereby reducing the volumetric flow of the roof runoff that continues to and around front end 116 to reduce the volume of flow around cover front end 116. As a result, the likelihood of roof runoff flow that might overshoot cover front end 116 when a heavy rainstorm takes place is minimized.

In addition to the rectangular openings 120 provided in the upper surface of cover 78, and as best seen in FIG. 8, a series of longitudinally-disposed larger area openings 134 are formed in the forwardly-extending front lip 136 of cover 78. Those additional openings 134 have a larger area than openings 120 in cover 78 and provide increased flow areas to receive and to allow to flow into gutter trough 76 roof runoff that flows around front end 116 of cover 78. The additional, larger area openings 134 can be of rectangular form, of oval form, or they can be generally rectangular openings having parallel linear longitudinal sides and straight lateral ends, or lateral ends defined by concave arcs or circular arcs, as shown in FIGS. 8 and 9. Openings 134 can have a longitudinal length of from about 1.25 in. to about 1.255 in., a width of from about 0.50 in. to about 0.51 in., and a longitudinal spacing between adjacent openings 134 of from about 1.25 in. to about 1.255 in.

Forwardly-extending front lip 136 of cover 78 is spaced from rounded front end 116 of cover 78, and is connected therewith by an integral intermediate connecting panel 138 that is inclined relative to forwardly-extending front lip 136 at an acute angle, which can be an acute angle of the order of from about 20° to about 25°. Forwardly-extending front lip 136 can be substantially parallel to cover top surface 114.

Figure 12:
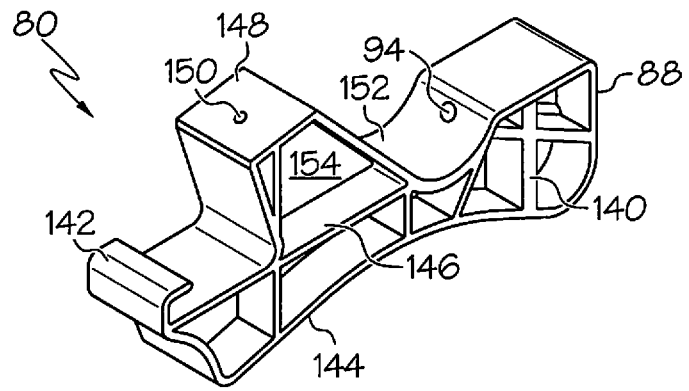
FIG. 12 is an upper, front perspective view of the gutter bracket shown in FIGS. 6 and 7.
Figure 13:
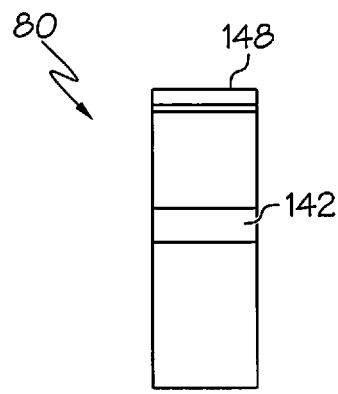
FIG. 13 is a front end view of the gutter bracket shown in FIG. 12.
Figure 14:
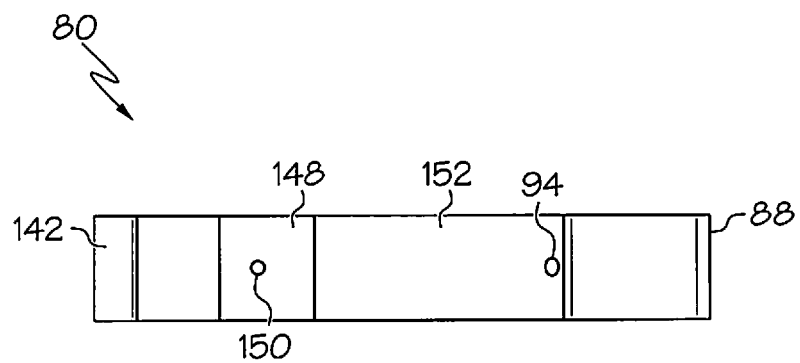
FIG. 14 is a top view of the gutter bracket shown in FIG. 12.

Bracket 80 of the gutter assembly embodiment shown in FIGS. 6 and 7 is shown in greater detail in FIGS. 12-14. The rear portion of bracket 80, which includes the inner end surface 88 that is closest to fascia board 82, includes a vertical rib 140 that is spaced about 1 in. from inner end surface 88 of the bracket and is parallel to that surface. In practice, brackets 80 are provided having a front-to-back length that allows them to be properly installed within a conventional gutter trough having a 6 in. front-to-back opening. If the retrofit is to be applied to an existing gutter trough having a 5 in. front-to-back opening, bracket 80 is shortened in its front-to-back dimension by cutting it along vertical rib 140 to remove 1 in. of the original front-to-back length of bracket 80, to thereby enable it to be properly positioned and installed within the upwardly-facing opening of the 5 in. gutter trough.

As more clearly shown in FIGS. 12-14, bracket 80 includes a curved front lip 142 that defines a hook-shaped front end member with an opening that faces inner end surface 88. Front lip 142 engages with curved lip 86 of gutter trough 76, as shown in FIG. 7, when bracket 80 is installed within a gutter trough. A concavely arched lower wall 144 is included on bracket 80 to provide increased cross-sectional flow area within gutter trough 76 for receiving roof runoff when the bracket is installed within gutter trough 76, as compared with a bracket structure having a planar lower wall. Extending rearwardly within bracket 80 from front lip 142 toward inner end surface 88 is a longitudinally-extending stiffening rib 146 to provide increased rigidity to bracket 80.

Positioned above and spaced from stiffening rib 146 is a planar platform 148 that faces upwardly from step 112 and includes an opening 150 at the outermost end of bore 110 that can receive fastener 104 shown in FIG. 7. The surface of platform 148 can lie against the lower surface of cover 78, or it can be spaced therefrom to serve to limit the extent of possible downward deflection of cover 78. The surface of platform 148 is inclined relative to a longitudinal axis that extends through and along stiffening rib 146, to cause cover 78 to slope downwardly from fascia board 82 to curved front end 116 to promote downward runoff flow along upper surface 114 of cover 78 and away from fascia board 82 toward front end 116. The angle of inclination can be from about 5° to about 15°. A recessed and concavely curved intermediate surface 152 of bracket 80 includes throughbore 94 that receives fastener 92 to retain bracket 80 to trough rear wall 90 and to be received in the building fascia board. A centrally positioned reinforcing panel 154 extends within bracket 80 between curved front lip 142 and the end panel that includes inner end surface 88. Bracket 80 can advantageously be formed from a rigid polymeric material by injection molding. Suitable bracket materials include ABS, polypropylene, and the like. Additionally, the side of bracket 80 that is not shown is the mirror image of the side that is shown in FIG. 7.

Figure 17:
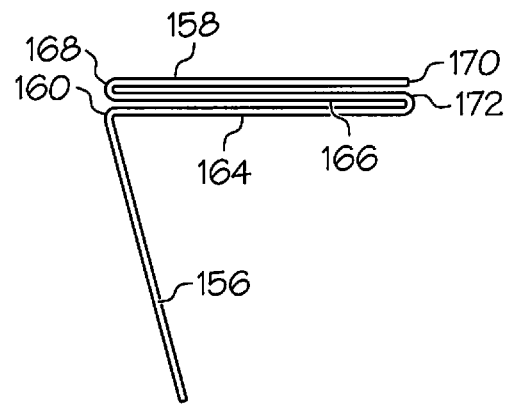
FIG. 17 is an end view of the cover support channel shown in FIG. 15.

Support channel 96 of the FIG. 7 embodiment is shown in greater detail in FIGS. 15-17. As shown in FIG. 17, support channel 96 is an L-shaped component in cross section and includes a longitudinally-extending, planar rear panel 156 that is adapted to lie against fascia board 82, as shown in FIG. 7, and a longitudinally-extending slot 172 having an opening that faces away from rear panel 156 and that is positioned adjacent the upper surface of rear panel 156. A top panel 158 extends laterally from longitudinal end 160 of planar rear panel 156. Top panel 158 extends from longitudinal end 160 at an included angle therebetween of from about 75° to about 85°, to substantially correspond with the inclination of the upper surface of step 112 of bracket 80, relative to a plane that passes along and through central stiffening rib 146.

As best seen in FIGS. 15 and 17, top panel 158 includes three layers that result from bending a larger width top panel through an angle of 180° about outer fold line 162 to define a first layer 164 and to provide an overlying second layer 166. The remainder of the larger width top panel is bent through an angle of 180° about inner fold line 168 to overlie second layer 166 and provide a third layer 170. The length dimensions of each of the first, second, and third layers are equal to each other, and the width dimensions of each of the first, second, and third layers can also be equal to each other.

As shown in FIGS. 7 and 17, a slot 172 is formed between second layer 166 and third layer 170. Slot 172 extends along the entire longitudinal length of support channel 96, and it has an opening height to correspond substantially with the thickness of cover inner end 102, to enable inner end 102 of cover 78 to be at least partially received within the slot. When cover 78 is formed from a sheet having a thickness of 0.032 in., slot 172 can have an opening of substantially that same size. Slot 172 has a depth sufficient to receive the cover inner end regardless of whether the retrofit cover arrangement is to be applied to an existing or to a new 5 in. gutter trough, or to an existing or to a new 6 in. gutter trough. As shown in FIG. 7, rear panel 156 of support channel 96 is adapted to lie against fascia board 82 and is securely attached thereto by a series of longitudinally-spaced fasteners 98.

FIGS. 18 through 22 show a gutter end cap 174 that is configured so that it can be attached at an end of the gutter troughs of the embodiments shown in FIGS. 6 and 7. End cap 174 overlies and closes an open longitudinal end of the gutter trough, and it also overlies and closes the open space between the open longitudinal end of the gutter trough and the gutter cover, to serve as a roof runoff flow blocking member to confine roof runoff flow within the gutter trough so that it flows to a downspout opening. It also serves as a leaf and debris deflector to prevent entry into the longitudinal ends of the gutter troughs of leaves, twigs, and other debris that could collect within the gutter trough and could lead to blockage of a gutter downspout opening.

End cap 174 includes an end panel 176 that is substantially planar, although it could be made to be slightly convex or concave, if desired. End panel 176 includes an outer face 178 and an inner face 180, and it has a perimeter that corresponds in shape with that of the cross section that is defined by the cross section of the gutter trough and the cross section between the upwardly-facing gutter trough opening and the overlying gutter cover, so that when end cap 174 is attached at an open longitudinal end of the gutter it completely closes the end of the gutter trough and cover assembly. Although only a left-hand end cap is shown and described, one that fits over the left longitudinal end of a rain gutter trough and its associated cover, it will be apparent to those skilled in the art that a right-hand end cap is similarly configured and is the mirror image of the left-hand end cap shown.

Positioned along the entire perimeter of end panel 176 is a flat peripheral flange 182 that extends in an outward lateral direction from each of outer face 178 and inner face 180 of end panel 176. Flange 182 is substantially perpendicular to each of outer face 178 and inner face 180, and it is a substantially continuous outer peripheral wall that defines an end cap top wall 184, an end cap rear wall 186, an end cap bottom wall 188, and an end cap front wall 190. Top wall 184 and rear wall 186 define an included angle of from about 75° to about 85°, because it engages the end of upper surface 114 of gutter cover panel 78, as it is shown in FIG. 7, which slopes downwardly away from fascia board 82 to which gutter trough 76 is attached, to allow the roof runoff to flow in a downward direction over and along the upper surface of gutter cover 78 and toward cover front end 116.

Figure 18:
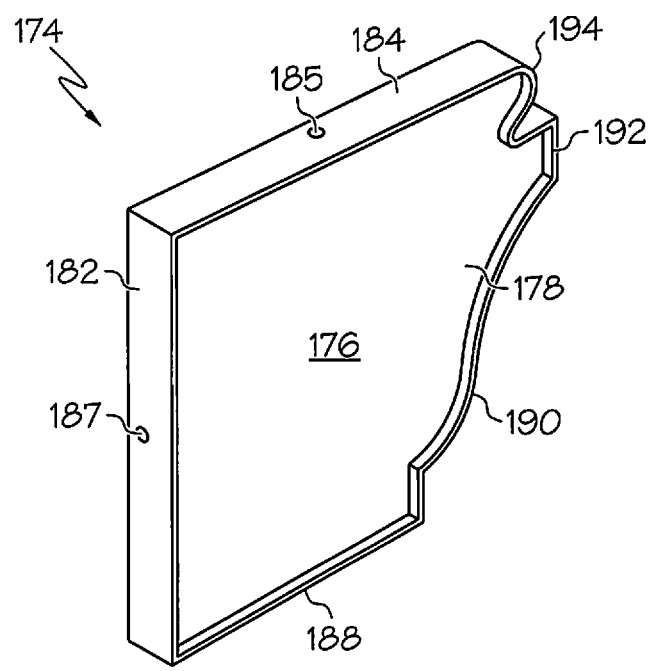
FIG. 18 is a perspective view of a gutter trough end cap for use with a covered rain gutter.
Figure 22:
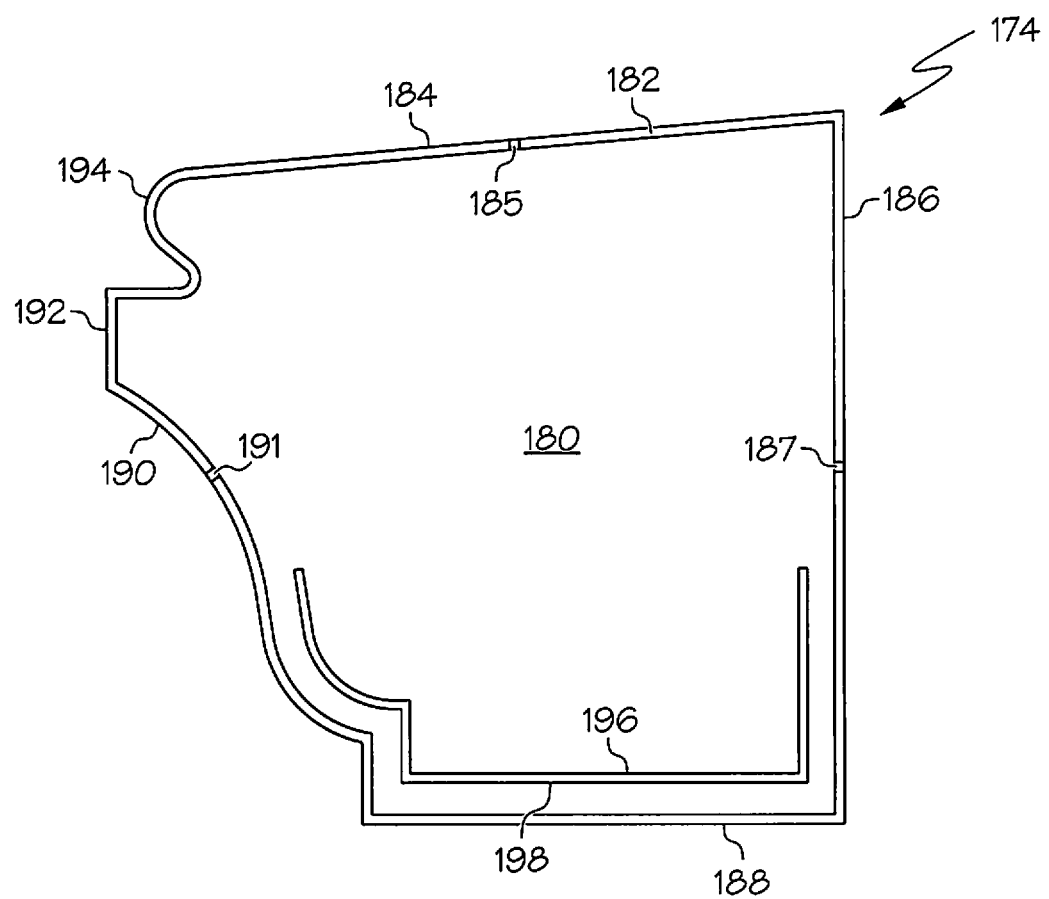
FIG. 22 is a rear elevational view of the inwardly-facing surface of the gutter trough end cap shown in FIG. 18.
Figure 23:
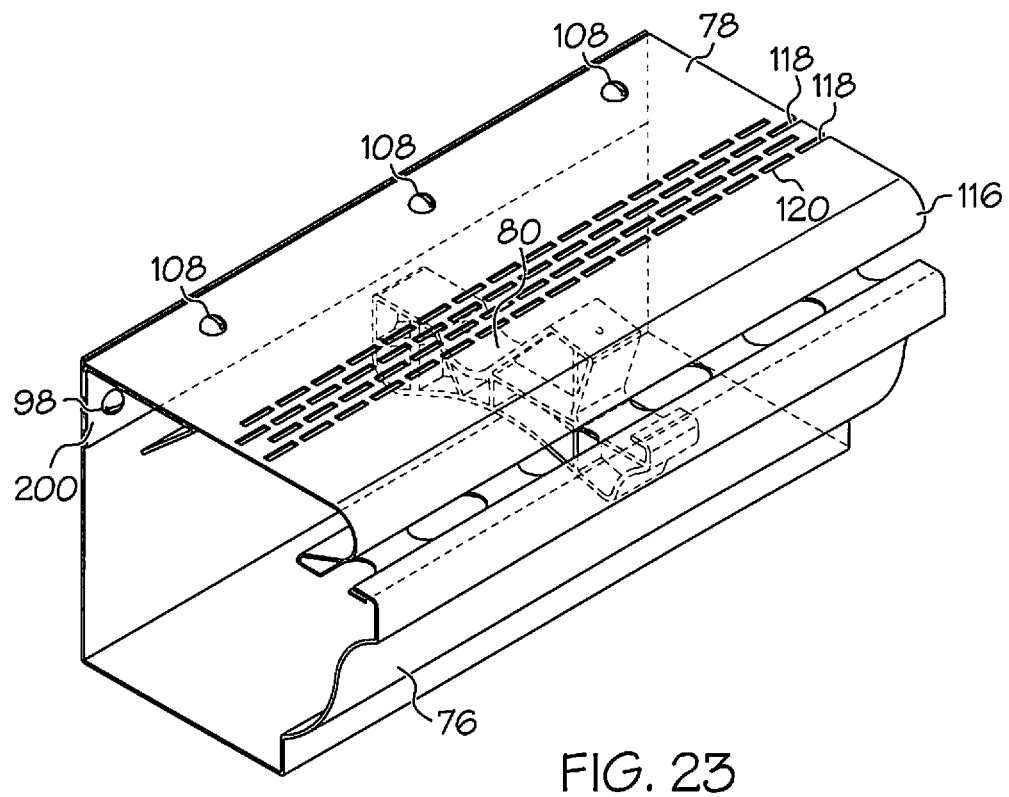
FIG. 23 is a front perspective view of another embodiment of a rain gutter assembly.
Figure 24:
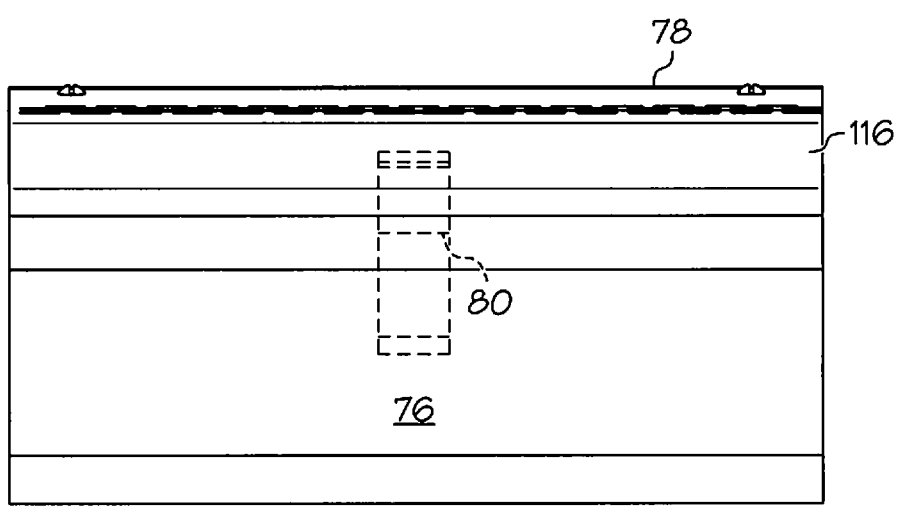
FIG. 24 is a front view of the gutter assembly shown in FIG. 23.
Figure 25:
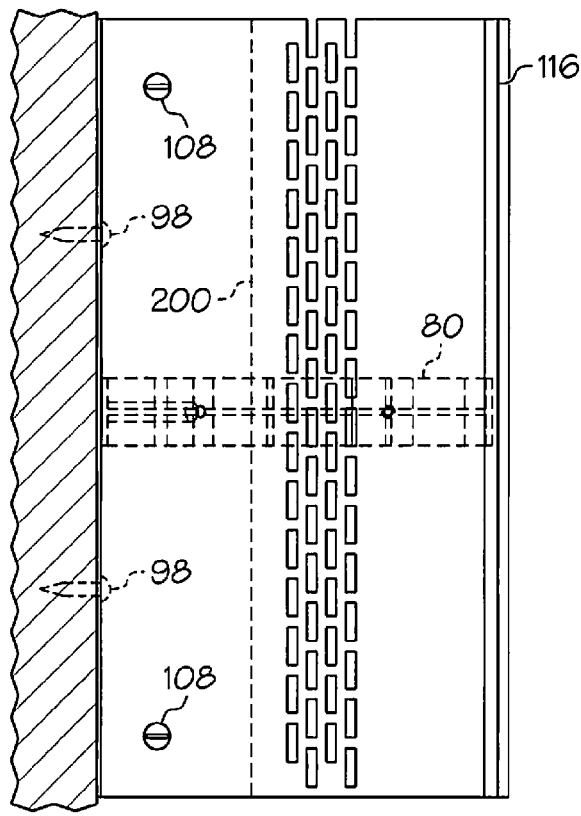
FIG. 25 is a top view of the gutter assembly shown in FIG. 23.
Figure 26:
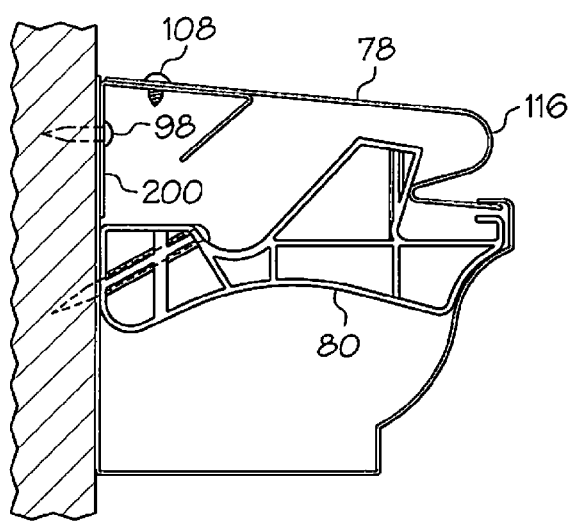
FIG. 26 is an end view of the gutter assembly shown in FIG. 23.

Bottom wall 188 of end cap 174 is substantially perpendicular to rear wall 186, while front wall 190 has a curved shape that corresponds with the curved cross section of the front wall of gutter trough 76. As shown in FIGS. 18, 19, and 22, front wall 190 is generally S-shaped in cross section and includes a first outward projection 192 that corresponds in shape with the cross-sectional shape of curved lip 86 of gutter trough 76, and a second outward projection 194 that corresponds in shape with the cross-sectional shape of curved front end 116 of gutter cover 78.

An aperture 185 is provided in end cap top wall 184, an aperture 187 is provided in end cap rear wall 186, and an aperture 191 is provided in end cap front wall 190. Each of apertures 185, 187, ad 191 can accommodate a respective attaching screw (not shown) to securely attach end cap 174 to gutter trough 76 and to gutter cover 78.

As best seen in FIGS. 19 and 22, an inner ridge 196 extends inwardly from the surface of inner face 180 of end cap 174. Inner ridge 196 is spaced from and is parallel to a portion of end cap rear wall 186, it is spaced from and is parallel to end cap bottom wall 188, and it is spaced from and follows a portion of end cap front wall 190. The spaces between inner ridge 196 and the inner surfaces of end cap walls 186, 188, and 190 define a gap or slot 198 that has a width of about 0.25 in., so that slot 198 of end cap 174 conforms with and is in is engagement with the corresponding outer end of gutter trough 76 when it is installed thereon. For additional sealing effect, a suitable caulking compound can be applied within slot 198 before the end cap is attached to the end of the gutter trough, to provide a leak-proof connection between the end cap and the gutter trough along the inner ridge 196. And as was the case with bracket 80, end cap 174 can advantageously be formed from a rigid plastic material by injection molding. Suitable end cap materials can include ABS, polypropylene, and the like.

FIGS. 23-30 show another embodiment of a rain gutter assembly attached to a building side wall. The embodiment shown in FIGS. 23-30 is similar in overall structure and function to the embodiment shown in FIG. 6. It can be a new gutter assembly installation, or it can be a retrofit arrangement for an existing gutter trough. In that regard, gutter trough 76 and cover 78 have the same structure, form, and cover aperture arrangement as is shown in the embodiment illustrated in FIGS. 6-11, and bracket 78 has the same structure, form, and aperture arrangement as is shown in the embodiment illustrated in FIGS. 6, 7, and 12-14. Further, the end cap shown in FIGS. 18-22 is usable with the gutter assembly shown in FIGS. 23-30.

The gutter assembly embodiment shown in FIGS. 23-30 includes a differently configured support channel 200 that is of simplified form and that utilizes less material. As shown in FIGS. 27-30, support channel 200 includes a rear wall 202, a single thickness top wall 204, and a downwardly and inwardly extending inward wall 206. Top wall 204 extends from the upper edge of rear wall 202 and is inclined relative to rear wall 202 to define an included angle that is smaller than 90°, and that can be from about 75° to about 85° in order to support cover 78 at an angle relative to the building side wall to promote downward flow of roof runoff away from the building and toward front end 116 of cover 78. Downwardly and inwardly extending wall 206 can form with top wall 204 an included angle of about 45°.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. A rain gutter assembly for collecting surface roof runoff from a building roof without clogging of the gutter by leaves and other debris, said rain gutter assembly comprising:
   a) a substantially U-shaped, elongated gutter trough for placement along and adjacent to a sloping roof of a building for collecting rain roof runoff from the roof, the gutter trough including a rear wall that is adapted to abut a substantially vertical building surface adjacent to an edge of the roof, a bottom wall extending substantially perpendicularly from the rear wall, and a front wall extending upwardly from a front edge of the bottom wall, wherein the rear wall, the bottom wall, and the front wall together define a U-shaped channel having an upwardly-facing opening, the front wall including an inwardly-extending lip at an uppermost edge;
   b) at least two support brackets positioned within the gutter trough and spaced from each other along the gutter channel, each support bracket including at least one passageway for receiving a connector for connecting the bracket and gutter trough rear wall to the building surface, the brackets each extending across the gutter channel and between and engaging each of the gutter trough rear wall and the gutter trough front wall and including:
      1) a bracket body having a hooked outer end adapted to engage the inwardly-extending lip of the gutter trough, and having an inner end including a mounting surface adapted to contact an inner surface of the gutter trough rear wall;
      2) at least one first passageway within the bracket body and extending toward the mounting surface and angularly arranged relative to the mounting surface for receiving a connector for connecting the support bracket and gutter trough to a substantially vertical building surface adjacent to a roof edge; and
      3) at least one second passageway extending into the bracket body for receiving a cover fastener for securing a gutter trough cover to the support brackets;
   c) a gutter trough cover overlying the upwardly-facing gutter trough opening, wherein the cover includes a plate-like cover body that angularly overlies and is spaced above the upwardly-facing opening of the gutter trough, the cover including an inturned, outwardly-facing front wall that defines a curved front surface of the cover body and that terminates at a front edge of the cover body, wherein the front edge of the cover body is secured to the brackets by fasteners that extend through the cover body front edge and into the second passageway of the brackets;
   wherein the cover front wall overlies and is spaced vertically from the inwardly-extending lip of the gutter trough to define a longitudinally-extending gap therebetween for receiving roof runoff flow from an upper surface of the cover, to and around the curved front surface of the cover, and into the gutter trough; the gutter cover including a plurality of longitudinally-extending, parallel rows of spaced gutter cover openings for receiving at least part of a roof runoff flow; wherein the openings of adjacent rows are longitudinally offset from each other and the openings of adjacent rows have respective transverse ends in overlapping relationship in a longitudinal direction of the cover to capture roof runoff flow; and
   d) support means for supporting a rear, inner end of the cover body relative to the building surface, the support means including a support channel for supporting the gutter trough cover in overlying relationship with the gutter trough, wherein the support channel is an elongated member having a substantially L-shaped cross section and includes a longitudinally-extending planar rear panel for attachment to the vertical building surface, and a longitudinally-extending planar top panel connected with and extending from the rear panel for attachment to the trough cover.

2. A rain gutter assembly in accordance with claim 1, wherein the uppermost edge of the gutter trough front wall includes a reentrant flange extending toward the gutter front wall.

3. A rain gutter assembly in accordance with claim 2, wherein the gutter trough reentrant flange engages the hooked outer ends of each of the brackets.

4. A rain gutter assembly in accordance with claim 3, wherein the hooked outer ends of the brackets include a reentrant flange that extends in an opposite direction to the gutter trough reentrant flange to engage with the gutter trough reentrant flange to vertically support the gutter trough front wall.

5. A rain gutter assembly in accordance with claim 1, wherein the gap between the gutter cover front wall and the inwardly-extending lip of the gutter trough defines a longitudinally-extending opening of from about ¼ in. to about ¾ in.

6. A rain gutter assembly in accordance with claim 1, wherein the cover body is inclined downwardly relative to the mounting surface at an inclination angle of from about 75° to about 85°.

7. A rain gutter assembly in accordance with claim 1, wherein the gutter cover openings are of substantially rectangular form and have a major axis and a minor axis, wherein the major axes of the cover openings within a row of openings are coaxial with each other.

8. A rain gutter assembly in accordance with claim 7, wherein the gutter cover openings have a longitudinal length of about ½ in. and a transverse width of about ⅛ in.

9. A rain gutter assembly in accordance with claim 8, wherein the gutter cover openings within a row of openings are spaced from each other by about 0.4 in.

10. A rain gutter assembly in accordance with claim 9, wherein the gutter cover openings include a recessed panel having an upwardly-facing surface that is spaced below the opening and is spaced below an inner surface of the cover, wherein the recessed panel is substantially rectangular and includes respective spaced longitudinal ends that are connected to the cover.

11. A rain gutter assembly in accordance with claim 10, wherein the gutter cover includes a pair of longitudinal openings between longitudinal ends of the recessed panel and longitudinal ends of the cover opening to define a pair of opposed, substantially rectangular, recessed openings for receiving roof runoff flow that enters the cover opening.

12. A rain gutter trough cover panel in accordance with claim 10, including a plurality of spaced, substantially parallel, longitudinally-extending ridges formed on the upper surface of the cover panel and spaced from the cover rear edge panel.

13. A rain gutter assembly in accordance with claim 11, wherein the spacing between the upwardly-facing surface of the recessed panel and the inner surface of the cover is from about 0.10 in. to about 0.125 in.

14. A rain gutter assembly in accordance with claim 1, wherein the gutter cover openings include downwardly and forwardly extending guide panels that have an upwardly-facing surface that is inclined relative to an upper surface of the gutter cover to provide openings for receiving and guiding roof runoff into the gutter trough.

15. A rain gutter assembly in accordance with claim 14, wherein the guide panels extend from a rearward longitudinal edge of the gutter cover openings, wherein the rearward longitudinal edge is rearward relative to the curved outer surface of the cover body.

16. A rain gutter trough cover panel in accordance with claim 14, including a plurality of spaced, substantially parallel, longitudinally-extending ridges formed on the upper surface of the cover panel and spaced from the cover rear edge panel.

17. A rain gutter assembly in accordance with claim 14, wherein the gutter cover openings are of substantially rectangular form and have a major axis and a minor axis, wherein the major axes of the cover openings within a row of openings are coaxial with each other.

18. A rain gutter assembly in accordance with claim 1, including a gutter end cap comprising:
   a) an end panel having an inner surface and an outer surface and including a perimeter having a predetermined shape;
   b) connection means carried by the end panel for connecting the end cap with an end of the gutter trough.

19. A rain gutter assembly in accordance with claim 18, wherein the connection means includes an outer peripheral wall extending laterally outwardly from the inner surface of the end panel and an inner peripheral wall extending laterally outwardly from the inner surface of the end panel and positioned inwardly of the outer peripheral wall to define therebetween a connection slot for connecting the end cap with and end of the gutter trough.

20. A rain gutter assembly in accordance with claim 19, wherein the outer peripheral wall defines an end cap top wall, an end cap rear wall, an end cap bottom wall, and an end cap front wall.

21. A rain gutter assembly in accordance with claim 20, wherein the outer peripheral wall is substantially continuous.

22. A rain gutter assembly in accordance with claim 21, wherein the outer peripheral wall and the inner peripheral wall are substantially perpendicular to the end panel inner surface.

23. A rain gutter assembly in accordance with claim 22, wherein the outer peripheral wall extends laterally outwardly from the end panel inner surface a greater distance than the inner peripheral wall.

24. A rain gutter assembly in accordance with claim 20, wherein the inner peripheral wall extends substantially along and parallel to the end cap front wall, the end cap bottom wall, and the end cap rear wall.

25. A rain gutter assembly in accordance with claim 24, wherein the inner peripheral wall extends along the end cap rear wall from a point between the end cap top wall and the end cap bottom wall, continuously along the end cap bottom wall, and to and along the end cap front wall to a point between the end cap top wall and the end cap bottom wall.

26. A rain gutter assembly in accordance with claim 20, wherein the outer peripheral wall includes openings for receiving fasteners for connecting the end cap with the gutter trough and with the gutter trough cover.

27. A support channel in accordance with claim 1, wherein the top panel includes a longitudinally-extending slot for receiving and supporting a planar panel of a rain gutter trough cover.

28. A support channel in accordance with claim 1, wherein the top panel includes an inwardly- and longitudinally-extending inner wall that extends from an outer edge of the top panel and is angularly disposed in a direction toward the rear panel.

* * * * *